Jan. 4, 1927.
C. A. MUDGE
1,612,828
ELECTRICAL MACHINE
Filed March 31, 1925
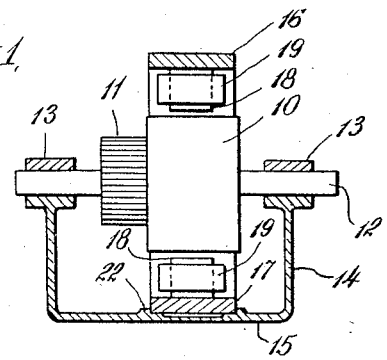
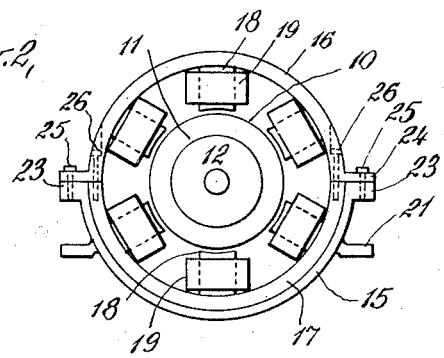
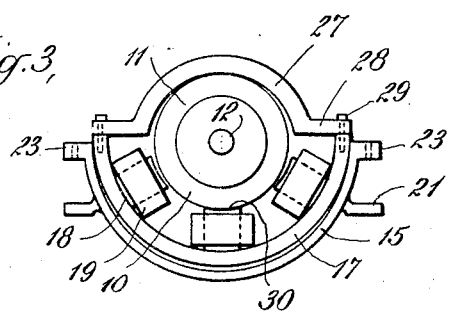
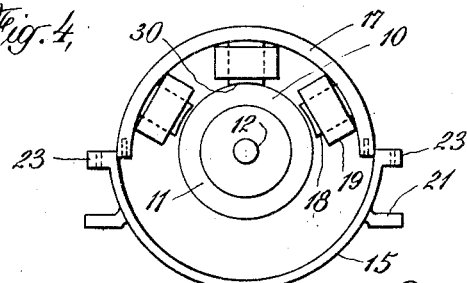
INVENTOR
Charles A. Mudge
BY
Pennie, Davis, Marvin & Edmonds
his ATTORNEYS Patented Jan. 4, 1927.

1,612,828

UNITED STATES PATENT OFFICE.

CHARLES A. MUDGE, OF ELIZABETH, NEW JERSEY, ASSIGNOR TO ELECTRO DYNAMIC COMPANY, OF BAYONNE, NEW JERSEY, A CORPORATION OF NEW JERSEY.

ELECTRICAL MACHINE.

Application filed March 31, 1925. Serial No. 19,592.

This invention relates to dynamo-electric machinery, and has to do more particularly with the design of such machinery intended to be installed in various restricted locations, where certain parts of the machine are normally inaccessible. The object of the invention is to provide machines for such use, the parts of which may be readily made accessible for inspection and repair, should occasion arise, and the invention includes both dynamo-electric machines of a design which makes inspection and repair even of the inaccessible parts a comparatively simple operation, and a method of disassembling such machines for repair or otherwise.

Dynamo-electric machines used, for example, on ship-board and in submarines, are ordinarily mounted in such positions that the field coils which lie beneath the main motor shaft are in a position in which they cannot be reached and this is due, in part, to the restricted space in which the machines are mounted, and also the necessity of placing other apparatus near them. As the field coils may require inspection and occasional repair, these operations have heretofore consumed much time, and have involved great expense, because of the great amount of preparatory work that has been required before access can be gained to the coils. In many machines a comparatively simple repair to one of the lower field coils requires the removal of the armature which, in turn, necessitates disconnecting the drive shaft of the machine, removing the electrical connections, and various other work of this sort.

In order to avoid the difficulties involved in the use of the machines now employed, I have provided a machine so constructed and arranged that its field coils may be easily placed in an accessible position. In a machine constructed in accordance with the principles of the invention, the pole pieces of the field are mounted on arcuate frame sections, of which there are usually two, semi-circular in shape and each carrying half of the pole pieces. These sections of the frame may be arranged with their contacting ends lying in a horizontal plane, or in a plane slightly inclined thereto, and the two sections may be bolted together, or may be hinged, so that the upper section may be removed completely, or else swung aside. Whenever it becomes desirable, for any reason, to get at a coil on the lower section, the upper section is removed and I then lock the lower field section with its pole pieces to the armature by appropriate means, whereupon the latter may be rotated to bring this field section into an upper or exposed position. The locking means employed for the purpose may be either electromagnetic or mechanical, and when the first means is utilized, I make use of the field coils to establish the magnetic flux required. Whichever arrangement is used, as will presently be described, the lower field coils are quickly and easily placed in the position in which they may be inspected and removed, if required, and this operation involves no considerable dismantling of the machine and, further, does not require that the main shaft be disconnected. The repairing of these machines, therefore, is a comparatively simple matter, and involves no considerable interruption of service.

For a clear understanding of the invention, reference will now be made to the accompanying drawings, in which, Fig. 1 is a vertical view, partly in section and largely diagrammatic, of a dynamo-electric machine constructed in accordance with the present invention, Fig. 2 is an end view of this machine, with certain parts, such as the drive shaft bearings, removed, Fig. 3 is a view similar to Fig. 2, but showing the relative position of the parts at one stage in the repair operation, and Fig. 4 is a view similar to Fig. 3 but showing the parts at a later stage in the operation.

Referring now to the drawings, the machine which may be either a motor or a generator, and is here illustrated as being of the direct current type, consists of an armature 10 of the customary form, provided with a commutator 11. This armature is mounted in the usual way on a main drive shaft 12, which is supported in bearings 13, mounted on extensions 14 of a cradle 15. The field frame is made in two parts, 16 and 17, which are illustrated as being semi-circular in form. Ordinarily but two such sections will be used, although under certain conditions the frame may be made up of more than two such sections. Each of these sections carries a plurality of pole pieces 18, on which are mounted the usual field coils 19. The present machine is shown as having six pole pieces, though a greater or less number may be employed. Also, in the present machine, the two sections are shown with their contacting ends lying in a horizontal plane, although in many instances these contacting ends will lie in a plane slightly tilted to the horizontal.

The lower field frame section 17 is illustrated as supported in a cradle 15, here shown as being semi-circular in form and provided with outstanding feet 21, which rest on any convenient support. For the purpose of this invention it is not essential that this cradle should extend entirely around the lower rim of the field frame, but may contact with it at appropriate points. The cradle is formed on its inner surface with upstanding flanges 22, forming a channel into which the section 17 is received, and at its ends, the cradle terminates in lugs 23, to which similar lugs 24 on the end of the upper field frame section are secured by bolts 25. The upper section is also connected to the lower section by bolts 26. It will be observed that with this arrangement the lower field frame section rests freely in the channel between the flanges 22 and the cradle, but is held in position therein by being connected to the upper section, which is, in turn, connected to the cradle.

In the event that the lower field coils become injured so that inspection or repair is required, it has heretofore been necessary to perform a considerable amount of preparatory work, involving the substantial disassembling of the machine, but with the machine constructed as above described, it is possible to render the lower field frame section readily accessible by locking it to the armature by appropriate means, then turning the main drive shaft slowly while the armature and field section are held coupled together, until the section is in the upper position shown in Fig. 4.

For this purpose, the procedure is as follows: The upper field frame section 16 is removed or swung to one side in case the machine is constructed with the upper section hinged to the cradle, as may be done in some cases. With the upper section displaced, a yoke 27 of the required strength and rigidity is placed on the upper surface of the armature. This yoke terminates in legs 28, which lie above the ends of the lower section, and when the latter is in its usual position in the cradle, the legs are spaced a short distance from these ends. Connecting devices, such as bolts 29, are now used to connect the legs and the ends of the section and as these bolts are drawn tight, the section is lifted up out of the cradle until the face of the pole piece 30 bears against the lower surface of the armature. With the parts in this position, the field coils are energized, and the magnetic flux passing between the pole pieces and through the armature, causes the field frame section to be locked magnetically to the armature. By the use of a sufficient energizing current, depending, of course, on the air gap between the surface of the armature and the faces of the poles, it would be possible to cause the field frame section to be attracted into the position illustrated, with the pole piece bearing against the armature surface, but owing to the difficulty of controlling the operation, there is a likelihood that the pole piece would strike the face of the armature with a heavy blow which might cause damage to the parts. It is therefore preferable to make use of the yoke for lifting the frame section to the position illustrated in Fig. 3. With the armature and field frame locked together magnetically, the yoke is now disconnected and removed. Then the armature shaft is rotated into the position illustrated in Fig. 4, in which the position of the parts is reversed. The field coils may now be de-energized, and the coils inspected. If a pole piece requires removal for repair, the field frame section may be raised the required amount to provide clearance, the pole piece removed, and, after repair, restored in place.

When the machine is to be assembled, the parts will again occupy the position shown in Fig. 4, whereupon the coils are energized to lock the field frame and armature together; then the armature is moved through 180°, the yoke again secured to the frame section to support the latter, the coils de-energized and then, by loosening the bolts 29, the section may be lowered into its customary position.

Ordinarily, even under the most extreme conditions, there will be a sufficient number of uninjured coils around the pole pieces to lock the field frame section to the armature, so as to permit the two to be rotated together to the desired position, but it may happen that all of the field coils on the pole pieces on the lower frame section are burned out. In this case, I lock the armature and field frame section together mechanically by means of a yoke similar to the yoke 27. The procedure in this case is as follows: The upper field frame section is removed as before; then a yoke similar to the yoke 27 is secured to the lower field frame section, and in making the connection the section is drawn up so that the pole piece 30 bears tightly against the face of the armature. With the yoke in place, the armature is now rotated through 180°, and, when the frame section is in the upper position, as shown in Fig. 4, the bolts on the yoke are slackened so as to permit the section to be raised from the face of the armature a sufficient amount to permit the damaged pole piece to be removed. In order to make use of a yoke in this manner, it will be necessary to arrange the bolts or other holding devices by which the yoke is secured to the field frame section, in such a way that they may be reached through the ends of the machine housing, but when the yoke and section are in the inverted position, it will be observed that the holding devices are in substantially the same position as when the yoke is uppermost, except that the devices are reversed. There will be no difficulty accordingly, in arranging these devices in such a manner that they can be easily reached. It will, of course, be necessary to employ a yoke which has a less diameter than the diameter of the inner face of the channel in the cradle, so that the yoke may pass freely through this channel, as the armature is turned.

It will be seen that by constructing the machine in the manner described, those parts of the field which are ordinarily in an inaccessible position may now be readily moved to a position in which the parts of the field may be inspected, and removed and repaired without difficulty. Ordinarily, I prefer to employ the magnetic method of locking the lower field section and armature together, in order to permit the field section to be raised to the upper position, and it will be only in the extreme case mentioned, that there are not a sufficient number of coils in the field to permit the establishment of the necesary magnetic flux for locking purposes. However, in this unusual situation, the yoke itself may be used as a locking device. I am aware that it has heretofore been proposed to make the field frame in the form of a ring, resting in a channel in a support, the ring being provided with screw threads so that by means of a worm, the entire frame may be rotated so as to raise a damaged coil to accessible position. A machine so constructed, however, is much more complicated than the present machine, and the operation of repairing a coil or rendering the parts accessible for inspection, is slow and laborious. The present method is much simpler and a machine designed in the manner described is also much less costly than one provided with means for rotating the entire field frame. Also, a great advantage which is afforded by the present machine design, lies in that repairs may be carried on without removing or altering the position of the armature, or disconnecting the armature shaft.

I claim:

1. A dynamo-electric machine constructed for ready disassembling for repair or otherwise, and having a rotary armature and a stationary field, which comprises a field frame made in two or more arcuate sections, pole pieces secured to these sections, and a cradle for supporting the frame, certain of the sections being freely disposed within the cradle, and the greatest radius of these sections being substantially the same as the internal radius of the cradle, whereby these sections may be locked to the armature and moved to a position beyond the cradle by the rotation of the armature.

2. A dynamo-electric machine constructed for ready disassembling for repair or otherwise, and having a rotary armature and a stationary field, which comprises a field frame made in two semi-circular sections enclosing the armature, pole pieces secured to these sections, a cradle for supporting the frame, one of the sections lying loosely in this cradle, and the greatest radius of this section being substantially the same as the internal radius of the cradle, whereby this section may be locked to the armature and moved out of the cradle by the rotation of the armature, and means for securing the other section to the cradle to hold the first section against movement therein.

3. A dynamo-electric machine constructed for ready disassembling for repair or otherwise, and having a rotary armature and a stationary field, which comprises a field frame made in upper and lower semi-circular sections enclosing the armature, the upper section terminating in radial lugs, pole pieces secured to the sections, a cradle for supporting the frame, the lower section lying loosely in the cradle and having its greatest radius substantially the same as the internal radius of the cradle, whereby the lower section may be locked to the armature and moved by the rotation of the latter to a position outside the cradle, and means for securing the lugs of the upper section to the cradle and thus holding the lower section in place therein.

4. A dynamo-electric machine constructed for ready disassembling for repair or otherwise, and having a stationary field and a rotary armature, which comprises a field frame made in upper and lower semi-circular sections enclosing the armature, pole pieces secured to these sections, a cradle having bearings for the armature shaft and serving to support the frame, the lower section of the frame lying loosely in this cradle and having its greatest radius substantially the same as the internal radius of the cradle, whereby this section may be locked to the armature and moved by the rotation of the latter to a position beyond the cradle, and means for securing the upper section to the cradle and thus holding the lower section against movement therein.

5. The improvement in disassembling for repair or otherwise a dynamo-electric machine having an armature and a field, one of which is rotatable and the other of which is formed in arcuate sections, which consists in removing one or more of said sections, then locking one of the remaining sections to the rotatable member, and then turning the two, while so locked, about the axis of rotation to carry the section to a more accessible position.

6. The improvement in disassembling for repair or otherwise a dynamo-electric machine having an armature and a field, one of which is rotatable and the other of which is in arcuate sections, which comprises removing one or more of said sections, locking one of the remaining sections to the rotatable member magnetically, then turning the two, while so locked, about the axis of rotation to carry this section to a more accessible position.

7. The improvement in disassembling for repair or otherwise a dynamo-electric machine having an armature and a field, one of which is rotatable and the other of which is in arcuate sections, which comprises removing one or more of said sections, moving one of the remaining sections until a pole piece thereon is in contact with the rotatable member, then locking this section to the rotatable member magnetically and turning the two, while so locked, about the axis of rotation to carry the section to a more accessible position.

8. The improvement in disassembling for repair, or otherwise a dynamo-electric machine having an armature and a field, one of which is rotatable and the other of which is in arcuate sections, which comprises removing one or more of said sections, moving one of the remaining sections until a pole piece thereon is in contact with the rotatable member, energizing one or more of the field coils on this section to cause the section and the rotatable member to be locked together, and then turning the two, while so locked, about the axis of rotation to carry the section to a more accessible position.

9. The improvement in disassembling for repair, or otherwise a dynamo-electric machine having an armature and a field, one of which is rotatable and the other of which is formed in arcuate sections, which comprises removing one or more of said sections, placing a yoke over the rotatable member, and securing its ends to the ends of the remaining sections, thereby moving the latter until one of the pole pieces thereon is in contact with the rotatable member, energizing one or more of the field coils on the said section to lock the sections to the rotatable member, and then turning the two, while so locked, about the axis of rotation to carry the section to a more accessible position.

In testimony whereof I affix my signature.

CHARLES A. MUDGE.